United States Patent
Kimura et al.

(10) Patent No.: US 8,466,233 B2
(45) Date of Patent: Jun. 18, 2013

(54) POLYLACTIC ACID-BASED RESIN COMPOSITION, MOLDED ARTICLE AND POLYLACTIC ACID-BASED MASTER BATCH PELLETS

(75) Inventors: Keisuke Kimura, Kyoto (JP); Kazue Ueda, Kyoto (JP)

(73) Assignee: Unitika Ltd., Hyogo (JP)

( * ) Notice: Subject to any disclaimer, the term of this patent is extended or adjusted under 35 U.S.C. 154(b) by 0 days.

(21) Appl. No.: 13/501,039

(22) PCT Filed: Nov. 29, 2010

(86) PCT No.: PCT/JP2010/071216
§ 371 (c)(1),
(2), (4) Date: Apr. 9, 2012

(87) PCT Pub. No.: WO2011/068081
PCT Pub. Date: Jun. 9, 2011

(65) Prior Publication Data
US 2012/0232220 A1    Sep. 13, 2012

(30) Foreign Application Priority Data
Dec. 2, 2009 (JP) ................................. 2009-274547

(51) Int. Cl.
*C08L 51/08* (2006.01)
*C08L 51/04* (2006.01)
*C08L 67/04* (2006.01)

(52) U.S. Cl.
USPC ..................... 525/63; 525/64; 525/69

(58) Field of Classification Search
USPC .............................. 525/63, 69, 64
See application file for complete search history.

(56) References Cited

U.S. PATENT DOCUMENTS

| 6,495,631 B1 | 12/2002 | Randall et al. | |
| 7,309,730 B2 | 12/2007 | Kim | |
| 2005/0245685 A1* | 11/2005 | Otake et al. | 525/191 |
| 2006/0106162 A1 | 5/2006 | Yamaguchi | |
| 2007/0276090 A1 | 11/2007 | Aoki et al. | |
| 2008/0071008 A1 | 3/2008 | Smillie et al. | |
| 2010/0317801 A1* | 12/2010 | Hirasawa | 525/190 |

FOREIGN PATENT DOCUMENTS

| JP | 2003-286396 | 10/2003 |
| JP | 2005-220171 | 8/2005 |
| JP | 2006-137853 | 6/2006 |
| JP | 2007-177140 | 7/2007 |
| JP | 2009-263526 | 11/2009 |
| WO | 2005/085352 | 3/2005 |
| WO | 2006/123608 | 11/2006 |
| WO | 2008/051443 | 5/2008 |

OTHER PUBLICATIONS

Supplementary European Search Report dated Sep. 26, 2012 in application EP 10 83 4531.

* cited by examiner

*Primary Examiner* — Jeffrey Mullis
(74) *Attorney, Agent, or Firm* — Fildes & Outland, P.C.

(57) ABSTRACT

A polylactic acid-based resin composition including a polylactic acid (A), a multilayered polymer (B) and a multilayered polymer (C), wherein the content of each of the multilayered polymer (B) and the multilayered polymer (C) is 0.5 to 8% by mass of the whole resin composition; the multilayered polymer (B) and the multilayered polymer (C) are each constituted of a core layer(s) and a shell layer(s); the core layer constituting the multilayered polymer (B) contains an acrylic rubber; and the core layer constituting the multilayered polymer (C) contains a composite rubber containing an acrylic component and a silicone component.

5 Claims, No Drawings

POLYLACTIC ACID-BASED RESIN COMPOSITION, MOLDED ARTICLE AND POLYLACTIC ACID-BASED MASTER BATCH PELLETS

TECHNICAL FIELD

The present invention relates to a polylactic acid-based resin composition excellent in transparency, flexibility, impact resistance and flex durability, and molded articles formed of the resin composition.

BACKGROUND ART

With the recent growth of the social demand for environmental preservation, films used as the packaging materials for newspapers, magazines and food are demanded to be formed of biodegradable resins. Among biodegradable resins, polylactic acid attracts a great deal of attention because polylactic acid is widely found in nature, is almost harmless to animals and plants and to human beings and beasts, has a melting point of 140 to 175° C., has a sufficient heat resistance, has an extremely high transparency, and is a relatively inexpensive thermoplastic resin and can be produced from plant-derived raw materials.

However, sheets and films formed of polylactic acid have properties of being extremely hard and brittle as long as these sheets and films are formed only of polylactic acid, and hence it has been difficult to use these sheets and films in such fields that require flexibility, impact resistance and flex durability.

Various studies have been made, for the purpose of improving the impact resistance and flex durability of polylactic acid. For example, Patent Literature 1 discloses a composition in which polycarbonate, a transparent resin excellent in impact resistance, is mixed with polylactic acid, and which contains an organic polysilane-polycarbonate copolymer and an acrylic core-shell impact modifier. Patent Literature 2 also discloses a heat-shrinkable film made of a mixed resin containing polylactic acid and a silicone-acryl composite rubber. Patent Literature 3 further discloses a fact that the impact resistance at low temperatures is improved by adding an epoxidized natural rubber to polylactic acid.

Although the resin compositions of Patent Literatures 1 to 3 are improved in impact resistance, the resin compositions of Patent Literatures 1 to 3 are impaired with respect to the transparency, which is an advantage of polylactic acid, and hence it has been difficult to use the resin compositions of Patent Literatures 1 to 3 in the applications to films for food and industrial films for which transparency is required.

Patent Literature 4 discloses a resin composition which contains an acrylic polymer satisfactory in compatibility with polylactic acid, polylactic acid, and a graft copolymer obtained by grafting a vinyl-based monomer to a rubber polymer. Although this resin composition is satisfactory in transparency, this resin composition is poor in flexibility and texture, and also insufficient in impact resistance and flex durability.

Patent Literature 5 discloses a resin composition containing polylactic acid and a multilayered polymer. For the purpose of obtaining resin compositions excellent in impact resistance, flexibility and flex durability, in Patent Literature 5 and the related patent documents, substantially one multilayered polymer is added in a content of at least approximately 10% by mass. Unless one multilayered polymer is added in a content of approximately 10% by mass, the improvement effect of the impact resistance and flex durability is not manifested, but when the addition amount is large, disadvantageously the transparency is degraded.

Patent Literature 6 discloses a resin composition containing polylactic acid, an epoxy-modified silicone-acrylic rubber and a methyl methacrylate-butadiene-styrene copolymer rubber. By using these two specific rubber components, this resin composition is improved in impact resistance as compared to the cases where rubber components other than these rubber components are used.

However, the epoxy-modified silicone-acrylic rubber reacts with polylactic acid, and consequently the resin composition tends to be gelified; accordingly, when a resin composition containing this rubber is molded into a sheet or a film, the gelified portion is conspicuous in such molded articles, and thus disadvantageously, molded articles poor in appearance quality and transparency are exclusively obtained.

In the methyl methacrylate-butadiene-styrene copolymer rubber, the core layer of the core-shell structure is a butadiene-styrene polymer, and hence, disadvantageously the transparency of the obtained resin composition or the obtained molded articles is impaired.

As described above, the resin composition disclosed in Patent Literature 6 is improved in impact resistance, but disadvantageously, tends to be gelified to impair the excellent transparency characteristic of polylactic acid; accordingly, it has been difficult to use the resin composition of Patent Literature 6 in the applications to sheets and films for which transparency is required.

CITATION LIST

Patent Literature
Patent Literature 1: U.S. Pat. No. 7,309,730
Patent Literature 2: Japanese Patent Laid-Open No. 2007-177140
Patent Literature 3: U.S. Pat. No. 6,495,631
Patent Literature 4: International Publication No. 2005/85352
Patent Literature 5: Japanese Patent Laid-Open No. 2003-286396
Patent Literature 6: Japanese Patent Laid-Open No. 2009-263526

SUMMARY OF INVENTION

Technical Problem

The present invention solves the aforementioned problems, and the technical problem of the present invention is to provide a polylactic acid-based resin composition capable of yielding molded articles excellent in all of transparency, impact resistance, flex durability and flexibility, and to provide molded articles obtained by molding the resin composition.

Solution to Problem

The present inventors made a series of studies for the purpose of solving the aforementioned problems, and consequently have reached the present invention by discovering that a polylactic acid-based resin composition is obtained in which by adding to polylactic acid two different multilayered polymers composed of specific components, the effects achieved by the two multilayered polymers are synergetically displayed, and thus, even the addition of small amounts of these multilayered polymers is able to achieve sufficient effects, and thus it is made possible to obtain molded articles excellent in transparency, impact resistance, flex durability and flexibility.

Specifically, the gist of the present invention is as follows.

(1) A polylactic acid-based resin composition including a polylactic acid (A), a multilayered polymer (B) and a multilayered polymer (C), wherein the content of each of the multilayered polymer (B) and the multilayered polymer (C) is 0.5 to 8% by mass of the whole resin composition; the multilayered polymer (B) and the multilayered polymer (C) are each constituted of a core layer(s) and a shell layer(s); the core layer constituting the multilayered polymer (B) contains an acrylic rubber; and the core layer constituting the multilayered polymer (C) contains a composite rubber containing an acrylic component and a silicone component.

(2) The polylactic acid-based resin composition according to (1), wherein the total content of the multilayered polymer (B) and multilayered polymer (C) is 2 to 16% by mass of the whole resin composition.

(3) A molded article including the polylactic acid-based resin composition according to (1) or (2).

(4) A polylactic acid-based master batch pellet constituted of a polylactic acid-based resin composition including a polylactic acid (A), a multilayered polymer (B) and a multilayered polymer (C), wherein the content of each of the multilayered polymer (B) and the multilayered polymer (C) is 8 to 30% by mass of the whole resin composition; the multilayered polymer (B) and the multilayered polymer (C) are each constituted of a core layer(s) and a shell layer(s); the core layer constituting the multilayered polymer (B) contains an acrylic rubber; and the core layer constituting the multilayered polymer (C) contains a composite rubber containing an acrylic component and a silicone component.

Advantageous Effects of Invention

The polylactic acid-based resin composition of the present invention includes a polylactic acid (A), a multilayered polymer (B) in which the core layer contains an acrylic rubber and a multilayered polymer (C) in which the core layer contains a composite rubber containing an acrylic component and a silicone component; accordingly, the effects achieved by the two multilayered polymers are synergetically displayed, and thus, even the addition of small amounts of these multilayered polymers is able to achieve sufficient effects. In other words, the polylactic acid-based resin composition of the present invention is excellent in impact resistance, flex durability and flexibility, with the proviso that the high transparency intrinsically possessed by polylactic acid is maintained.

The polylactic acid-based resin composition of the present invention can be molded into various molded articles such as films, sheets, injection molded articles and foams; the thus obtained molded articles are made of the polylactic acid-based resin composition of the present invention, and hence are excellent in transparency, impact resistance, flex durability and flexibility, and accordingly can be widely used in various uses.

When the polylactic acid-based master batch pellet of the present invention is used, the polylactic acid-based resin composition of the present invention can be easily obtained, and the workability and the operability in obtaining the molded articles of the present invention can also be improved.

DESCRIPTION OF EMBODIMENTS

Hereinafter, the present invention is described in detail.

The polylactic acid-based resin composition (hereinafter, abbreviated as the resin composition, as the case may be) includes a polylactic acid (A), a multilayered polymer (B) in which the core layer contains an acrylic rubber and a multilayered polymer (C) in which the core layer contains a composite rubber containing an acrylic component and a silicone component.

First, the polylactic acid (A) is described. Examples of the polylactic acid (A) in the present invention include poly(L-lactic acid) in which the structural unit of the lactic acid is L-lactic acid, poly(D-lactic acid) in which the structural unit of the lactic acid is D-lactic acid, poly(DL-lactic acid) which is a copolymer of L-lactic acid and D-lactic acid, and mixtures of these.

The mass average molecular weight of the polylactic acid (A) is preferably 100,000 to 300,000 and more preferably 120,000 to 200,000. When the mass average molecular weight of the polylactic acid (A), which is the main component of the resin composition, is less than 100,000, the obtained molded articles tend to be poor in mechanical properties. On the other hand, when the mass average molecular weight of the polylactic acid (A) exceeds 300,000, the melt viscosity becomes too high, and hence the melt extrusion in obtaining molded articles tends to be difficult.

In the present invention, as the polylactic acid (A), a crystalline polylactic acid and a non-crystalline polylactic acid can be used in combination. In consideration of the stability and the maintenance of the heat resistance in production of molded articles, it is preferable to use a crystalline polylactic acid, and the mixing ratio (crystalline polylactic acid/non-crystalline polylactic acid) between the crystalline polylactic acid and the non-crystalline polylactic acid is preferably 80/20 to 100/0 (mass ratio). The crystalline polylactic acid as referred to herein means a polylactic acid having a melting point falling within a range from 140 to 175° C., and the non-crystalline polylactic acid as referred to herein means a polylactic acid having substantially no melting point.

For the purpose of allowing the polylactic acid (A) to be a crystalline polylactic acid, the content of the D-isomer in the polylactic acid (A) is preferably 5 mol % or less and more preferably 2 mol % or less. When the content of the D-isomer exceeds 5 mol %, the crystallinity of the polylactic acid is degraded, and even the addition of a crystal nucleating agent or the application of a specific heat treatment does not result in sufficient crystallization, the operability in obtaining molded articles is degraded, and the obtained molded articles tend to be poor in heat resistance.

The content of the residual lactide in the polylactic acid (A) is preferably 0.5% by mass or less and more preferably 0.02 to 0.4% by mass. When the content of the residual lactide exceeds 0.5% by mass, at the time of obtaining a molded article, for example at the time of making a sheet or a film, smoke emission is remarkable, and hence the devices around the dice tend to be contaminated, the quality of the product tends to be degraded or the operability tends to be degraded.

Examples of the method for reducing the content of the residual lactide include: a method in which the residual lactide is removed at a temperature equal to or higher than the melting point of the lactide under reduced pressure during the polymerization of the polylactic acid (A); a method in which the residual lactide is removed by treating, at high temperatures (60 to 160° C.) under reduced pressure, the pellets after the polymerization of the polylactic acid (A); and a method in which the residual lactide is removed through extraction by immersing the pellets after the polymerization of the polylactic acid (A) into warm water.

The resin composition of the present invention is mainly composed of the polylactic acid (A), and the content of the polylactic acid (A) is preferably 80 to 99% by mass and more preferably 84 to 98% by mass of the whole resin composition.

In the resin composition of the present invention, the aforementioned polylactic acid (A) includes as multilayered polymers two different multilayered polymers, namely, the multilayered polymer (B) and the multilayered polymer (C).

The multilayered polymer as referred to in the present invention is constituted of at least a core layer and at least a shell layer covering the core layer, the abutting layers being constituted of polymers different from each other, and is a polymer having a so-called core-shell structure. The number of the core layers and the number of the shell layers are respectively one or more, and the multilayered polymer may have a plurality of layers, namely, two or more layers.

First, the multilayered polymer (B) is described.

The present invention uses, as the multilayered polymer (B), a multilayered polymer in which the core layer contains an acrylic rubber. The inclusion of this multilayered polymer (B) in the polylactic acid-based resin composition enables to improve the impact resistance, the flex durability and the flexibility of the obtained molded articles; moreover, even the inclusion of this multilayered polymer (B) in the resin composition does not impair the excellent transparency of polylactic acid.

The acrylic rubber contained in the core layer of the multilayered polymer (B) preferably contains as a monomer an acrylic acid alkyl ester. The content of the acrylic acid alkyl ester monomer is preferably 50 to 100% by mass, more preferably 60 to 95% by mass and furthermore preferably 65 to 95% by mass of the total mass of the monomers constituting the acrylic rubber. When the content of the acrylic acid alkyl ester monomer is less than 50% by mass, the impact resistance and the like of the finally obtained molded articles are not sufficiently improved, and the transparency of the molded articles may also be degraded.

Specific examples of the acrylic acid alkyl ester include methyl acrylate, ethyl acrylate, n-propyl acrylate, n-butyl acrylate, 2-ethylhexyl acrylate, octyl acrylate, tridecyl acrylate, ethoxyethoxyethyl acrylate, methoxytripropylene glycol acrylate, 4-hydroxybutyl acrylate, lauryl acrylate, methyl methacrylate, ethyl methacrylate, n-propyl methacrylate, butyl methacrylate, lauryl methacrylate and stearyl methacrylate; preferable among these is n-butyl acrylate.

Except when only an acrylic acid alkyl ester monomer is used as the monomer constituting the acrylic rubber, the acrylic rubber is obtained by polymerizing a mixture composed of an acrylic acid alkyl ester monomer and another monomer or other monomers. Examples of the other monomer include an aromatic vinyl monomer and a vinyl monomer copolymerizable with the acrylic acid alkyl ester monomer and/or an aromatic vinyl monomer. If necessary, a multifunctional monomer may be contained in a content of about 5% by mass or less.

In the present invention, the shell layer of the multilayered polymer (B) is preferably obtained by graft polymerizing one or two or more vinyl-based monomers to the acrylic rubber of the core layer, in the presence of the aforementioned acrylic rubber of the core layer. In this way, the multilayered polymer (B) is preferably an acrylic rubber graft copolymer.

Preferable as the vinyl-based monomer are: aromatic alkenyl compounds such as styrene, α-methylstyrene and vinyltoluene; methacrylic acid esters such as methyl methacrylate and 2-ethylhexyl methacrylate; acrylic acid esters such as methyl acrylate, ethyl acrylate and n-butyl acrylate; and vinyl cyanide compounds such as acrylonitrile and methacrylonitrile. These vinyl-based monomers can be used each alone or in combinations of two or more thereof. The used amount of these monomers is preferably 20% by mass or less of the acrylic rubber graft copolymer.

The aforementioned multilayered polymer (B) is different from the below-described multilayered polymer (C); the core layer(s) and the shell layer(s) of the multilayered polymer (B) preferably do not contain the silicone component contained in the core layer(s) of the multilayered polymer (C).

As long as the above-described constitution is satisfied, two or more of the aforementioned multilayered polymers (B) may be included in the polylactic acid-based resin composition of the present invention.

Commercially available examples of the multilayered polymer (B) include: "Paraloid BPM-500" manufactured by Rohm and Haas Corp., "Paraloid BPM-515" manufactured by Rohm and Haas Corp., "Metablen W-450A" manufactured by Mitsubishi Rayon Co., Ltd., "Metablen W-600A" manufactured by Mitsubishi Rayon Co., Ltd. and "Kane Ace FM-50" manufactured by Kaneka Corp.; these can be used each alone or in combinations of two or more thereof.

Next, the multilayered polymer (C) is described.

The present invention uses, as the multilayered polymer (C), a multilayered polymer in which the core layer contains a composite rubber containing an acrylic component and a silicone component. The inclusion of this multilayered polymer (C) in the polylactic acid-based resin composition enables to improve the impact resistance, the flex durability and the flexibility of the obtained molded articles.

Examples of the composite rubber containing an acrylic component and a silicone component include: a rubber constituted of the component obtained by copolymerizing the acrylic component and the silicone component; and a mixture obtained by blending a rubber composed of the acrylic component and a rubber composed of the silicone component.

In such a composite rubber containing an acrylic component and a silicone component, the contents of both of these components are preferably such that the content of the acrylic component is 1 to 99% by mass and the content of the silicone component is 99 to 1% by mass.

The silicone component in the core layer can be prepared by performing emulsion polymerization by using an organosiloxane and a cross-linking agent; in this case, a graft-crossing agent can also be used in combination.

Examples of the organosiloxane include: chain organosiloxanes such as dimethylsiloxane and diethylsiloxane; cyclic organosiloxanes such as hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane and octaphenylcyclotetrasiloxane. These are used each alone or as mixtures of two or more thereof. The used amount of the organosiloxane(s) is preferably 50% by mass or more and more particularly preferably 70% by mass or more in the silicone component.

Examples of the cross-linking agent include trimethoxymethylsilane, triethoxyphenylsilane, tetramethoxysilane, tetraethoxysilane, tetra-n-propoxysilane and tetrabutoxysilane. The used amount of the cross-linking agent is preferably 0.1 to 30% by mass in the silicone component.

Examples of the compound forming the graft-crossing agent include: β-methacryloyloxyethyldimethoxymethylsilane, γ-methacryloyloxypropylmethoxydimethylsilane, γ-methacryloyloxypropyldimethoxymethylsilane, γ-methacryloyloxypropyltrimethoxysilabe, γ-methacryloyloxypropylethoxydiethylsilane, γ-methacryloyloxypropyldiethoxymethylsilane, γ-methacryloyloxybutyldiethoxymethylsilane, p-vinylphenyldimethoxymethylsilane, tetramethyltetravinylcyclotetrasiloxane, γ-mercaptopropyldimethoxymethylsilane, γ-mercaptopropylmethoxydimethylsilane and γ-mercaptopropyldiethoxymethylsilane. The used amount of the graft-crossing agent is preferably 0 to 10% by mass and more preferably 0.5 to 5% by mass in the silicone component.

On the other hand, the acrylic component of the core layer can be prepared by using alkyl (meth)acrylate, a cross-linking agent and a graft-crossing agent. The composite rubber may be obtained by mixing the acrylic component thus prepared and the aforementioned silicone component, or alternatively the composite rubber may be obtained by adding, in the presence of the silicone component, alkyl (meth)acrylate, a cross-linking agent and a graft-crossing agent and by polymerizing the acrylic component.

Examples of the alkyl (meth)acrylate include methyl acrylate, ethyl acrylate, n-propyl acrylate, n-butyl acrylate, 2-ethylhexyl acrylate, hexyl methacrylate, 2-ethylhexyl methacrylate and n-lauryl methacrylate; preferable is n-butyl acrylate.

Examples of the cross-linking agent include ethylene glycol dimethacrylate, propylene glycol dimethacrylate, 1,3-butylene glycol dimethacrylate and 1,4-butylene glycol dimethacrylate.

Examples of the graft-crossing agent include allyl methacrylate, triallyl cyanurate and triallyl isocyanurate. Ally methacrylate can also be used as a cross-linking agent.

The cross-linking agents or the graft-crossing agents are used each alone or in combinations of two or more thereof. The total used amount of the cross-linking agent(s) and the graft-crossing agent(s) is preferably 0.1 to 20% by mass in the acrylic component.

In the present invention, the shell layer of the multilayered polymer (C) is preferably obtained by graft polymerizing one or two or more of vinyl-based monomers in the presence of the composite rubber containing the aforementioned acrylic component and the aforementioned silicone component of the core layer. The multilayered polymer (C) is preferably a composite rubber graft copolymer composed of the composite rubber containing the acrylic component and the silicone component and the grafting part.

Examples of the vinyl-based monomer include: aromatic alkenyl compounds such as styrene, α-methylstyrene and vinyltoluene; methacrylic acid esters such as methyl methacrylate and 2-ethylhexyl methacrylate; acrylic acid esters such as methyl acrylate, ethyl acrylate and n-butyl acrylate; and vinyl cyanide compounds such as acrylonitrile and methacrylonitrile. These vinyl-based monomers can be used each alone or in combinations of two or more thereof.

In the present invention, as described above, the multilayered polymer (C) is constituted of the core layer(s) that contains the composite rubber containing the acrylic component and the silicone component and the shell layer(s); preferably the multilayered polymer (C) does not contain as the constituent components unreacted epoxy groups and/or unreacted allyl groups. When the multilayered polymer (C) contains unreacted epoxy groups and/or unreacted allyl groups, these groups react with the polylactic acid (A) and the polylactic acid (A) tends to be gelified; accordingly, when a resin composition including the multilayered polymer (C) is molded into a sheet or a film, the gelified portion is conspicuous in such a molded article, and thus it comes to be difficult to obtain molded articles suitable for practical use.

Two or more types of the aforementioned multilayered polymers (C) may be contained in the polylactic acid-based resin composition of the present invention as long as the multilayered polymers (C) satisfy the aforementioned constitution.

Examples of the aforementioned multilayered polymer (C) include "Metablen S-2006" manufactured by Mitsubishi Rayon Co., Ltd., "Metablen S-2001" manufactured by Mitsubishi Rayon Co., Ltd., "Metablen S-2005" manufactured by Mitsubishi Rayon Co., Ltd. and "Genioperl" manufactured by Wacker Asahikasei Silicone Co., Ltd.; these can be used each alone or in combinations of two or more thereof.

The polylactic acid-based resin composition of the present invention is a resin composition including the polylactic acid (A), the multilayered polymer (B) and the multilayered polymer (C) as described above. In the present invention, it is the important point that the multilayered polymer (B) and the multilayered polymer (C) are selected as the multilayered polymers and used in combination.

By using two multilayered polymers, namely, the multilayered polymer (B) and the multilayered polymer (C), the effects of these multilayered polymers are synergetically displayed; even when the multilayered polymer (B) and the multilayered polymer (C) are each added in a small amount in the resin composition, the effects respectively possessed by these multilayered polymers are sufficiently displayed, and it comes to be possible to obtain molded articles excellent in transparency, impact resistance, flex durability and flexibility. Accordingly, the use of these two multilayered polymers is also advantageous from the aspect of cost.

A resin composition in which only the multilayered polymer (B) is added results in molded articles to be insufficient in the improvement of the impact resistance, flex durability and flexibility. A resin composition in which only the multilayered polymer (C) is added results in molded articles being more improved in impact resistance, flex durability and flexibility as compared to the case of adding only the multilayered polymer (B), but being poor in transparency.

The content of the multilayered polymer (B) is required to be 0.5 to 8% by mass and is preferably 0.5 to 5% by mass and more preferably 1.0 to 3.5% by mass of the whole resin composition. When the content of the multilayered polymer (B) is less than 0.5% by mass, it comes to be difficult to obtain molded articles excellent in impact resistance, flex durability and flexibility. On the other hand, when the content of the multilayered polymer (B) exceeds 8% by mass, the excellent transparency characteristic of polylactic acid is impaired to result in molded articles poor in transparency.

The content of the multilayered polymer (C) is required to be 0.5 to 8% by mass and is preferably 0.5 to 5% by mass and more preferably 1.0 to 3.5% by mass of the whole resin composition. When the content of the multilayered polymer (C) is less than 0.5% by mass, it is impossible to impart impact resistance, flex durability and flexibility to the resulting molded articles. On the other hand, when the content of the multilayered polymer (C) exceeds 8% by mass, the excellent transparency characteristic of polylactic acid is impaired to result in molded articles poor in transparency.

The total content of the multilayered polymer (B) and the multilayered polymer (C) in the resin composition of the present invention is preferably 2 to 16% by mass, more preferably 2 to 10% by mass and furthermore preferably 2 to 7% by mass of the whole resin composition.

When the total content of the multilayered polymer (B) and the multilayered polymer (C) is less than 2% by mass, the advantageous effects of the present invention due to the inclusion of the multilayered polymers become poor, and the impact resistance, the flex durability and the flexibility tend to be imparted insufficiently. On the other hand, when the total content of the multilayered polymer (B) and the multilayered polymer (C) exceeds 16% by mass, the resulting molded articles are poor in transparency.

The mass ratio (multilayered polymer (B)/multilayered polymer (C)) between the multilayered polymer (B) and the multilayered polymer (C) included in the polylactic acid-based resin composition of the present invention is preferably 30/70 to 70/30 and more preferably 40/60 to 60/40 with the proviso that the multilayered polymers (B) and (C) satisfy the aforementioned contents thereof. When the mass ratio falls within the aforementioned range, the effects of both of the multilayered polymers are displayed in a balanced manner; thus, the aforementioned synergetic effects due to the combined use of both multilayered polymers are sufficiently displayed, and it comes to be possible to obtain molded articles excellent in all of transparency, impact resistance, flex durability and flexibility.

As described above, the polylactic acid-based resin composition of the present invention enables to yield molded articles excellent in transparency, impact resistance, flex durability and flexibility. Although the molded articles obtained from the resin composition of the present invention are described below, the index indicating the transparency of the molded articles is such that in the case of a sheet of 100 to 500 µm in thickness, the haze value thereof can be made to be 10% or less; in particular, the haze value is preferably less than 7% and more preferably less than 6%.

In the case of a film of 10 to 60 µm in thickness, the haze value thereof can be made to be 4% or less. In particular, the haze value is preferably less than 3%. When the haze value of a film is less than 3%, the transparency of the film is extremely satisfactory; for example, even when printing is performed on the back side of the film, the printed matter can be clearly discerned from the front side. When the haze value is 3% or more, the transparency of the film is degraded; when printing is performed on the back side as described above, the printed matter cannot be clearly discerned when viewed from the front side.

The impact resistance, the flex durability and the flexibility in the present invention are mutually related properties. The index indicating these properties is such that in the case of a sheet of 100 to 500 µm in thickness, the impact strength (the measurement method is described in below-described Examples) can be made to be 5 kgf·cm/100 µm or more; in particular, the impact strength is preferably 8 kgf·cm/100 µm or more and more preferably 10 kgf·cm/100 µm or more.

In the case of a film of 10 to 60 µm in thickness, the flex durability evaluated by the Gelbo test (the evaluation method is described in below-described Examples) is such that the number of the spots of the ink transferred to a sheet of white paper can be made to be less than 10 in 200 times flex; in particular, the number of the spots of the ink transferred to a sheet of white paper is preferably less than five in 200 times flex.

With conventional techniques, it has been difficult to obtain polylactic acid-based resin compositions capable of producing molded articles excellent both in transparency and in properties such as impact resistance. However, in the course of the study made by the present inventors, it has been found that both of the transparency and the properties such as the impact resistance are specifically improved under the conditions that the multilayered polymer (B) in which the core layer contains an acrylic rubber and the multilayered polymer (C) in which the core layer contains a composite rubber containing an acrylic component and a silicone component are selected among multilayered polymers, and these two multilayered polymers (B) and (C) are used in combination and contained in the specific contents. Although the mechanism for this finding is not clear, the polylactic acid (A), the multilayered polymer (B) and the multilayered polymer (C) are excellent in compatibility, and presumably, the excellent dispersibility of these in the resin composition is involved in the mechanism.

In the polylactic acid-based resin composition of the present invention, other components may be contained in addition to the three components, namely, the polylactic acid (A), the multilayered polymer (B) and the multilayered polymer (C) within the ranges not impairing the advantageous effects of the present invention. Examples of such other components include various additives such as an ultraviolet preventing agent, a light stabilizer, an anticlouding agent, an antifog agent, an antistatic agent, a plasticizer, a flame retardant, a color protecting agent, an antioxidant, a filler, a pigment, a release agent, a desiccant, an oxygen barrier agent and a crystal nucleating agent. However, components containing functional groups (such as an epoxy group and an allyl group) having reactivity are not preferable. When functional groups (such as an epoxy group and an allyl group) having reactivity are contained in the resin composition, such functional groups react with polylactic acid and the polylactic acid tends to be gelified. The gelification of the polylactic acid causes the occurrence of the gelified portion in the obtained molded articles, and the quality of the molded articles is degraded and the transparency of the molded articles also tends to be degraded.

Next, the polylactic acid-based master batch pellet (hereinafter, abbreviated as the master batch pellet as the case may be) of the present invention is described. The master batch pellet of the present invention is preferably used in the production of the polylactic acid-based resin composition of the present invention.

The multilayered polymer (B) and the multilayered polymer (C) are frequently in powder state, and hence the contamination of the supply line in the production process tends to offer problems. Accordingly, in the production of the polylactic acid-based resin composition of the present invention, it is preferable to adopt a method in which a master batch pellet in which the multilayered polymer (B) and the multilayered polymer (C) are added in the polylactic acid (A) in high concentrations is prepared, and the polylactic acid-based resin composition is obtained by diluting this master batch pellet with the polylactic acid (A).

Accordingly, the master batch pellet of the present invention is constituted of a resin composition including the polylactic acid (A), the multilayered polymer (B) and the multilayered polymer (C).

The content of the multilayered polymer (B) is 8 to 30% by mass and preferably 10 to 20% by mass of the whole resin composition; the content of the multilayered polymer (C) is also 8 to 30% by mass and preferably 10 to 20% by mass of the whole resin composition.

In the case where the content of the multilayered polymer (B) or the multilayered polymer (C) is less than 8% by mass of the whole resin composition, the used amount of the master batch pellet comes to be large when the resin composition of the present invention is obtained; thus, such a master batch pellet cannot be said to be a master batch pellet containing the multilayered polymers in high concentrations. On the other hand, in the case where the content of the multilayered polymer (B) or the multilayered polymer (C) exceeds 30% by mass of the whole resin composition, the operability during the preparation of the master batch pellet is degraded, the dispersibility of the multilayered polymers comes to be low, and concentration unevenness occurs in the obtained master batch pellet.

Next, description is made on the method for producing the polylactic acid-based resin composition of the present invention wherein such a master batch pellet as described above of the present invention is produced, and then the pellet is diluted with the polylactic acid (A) to yield the polylactic acid-based resin composition.

First, description is made on the method for producing the master batch pellet of the present invention. In an extruder, the polylactic acid (A), the multilayered polymer (B) and the multilayered polymer (C) are added and melt-kneaded. In this case, preferable is a method in which melt-kneading is performed with a single screw extruder or a double screw extruder, heating is made to a cylinder temperature of 180 to 230° C. and to a die temperature of 190 to 240° C., the resin composition is melt-kneaded and extruded, and the strand is cooled and then cut to the pellet size. The extruder used is preferably a double screw extruder from the viewpoint of kneading capability. The polylactic acid (A) is fed from a hopper, and the multilayered polymers (B) and (C) are different in particle size from each other and are large in addition amount, and hence are preferably added as metered with separate feeders, respectively. When the multilayered polymer (B) and the multilayered polymer (C) are added from separate feeders, respectively, in a single screw extruder or a double screw extruder, the addition is preferably performed at positions nearer to the feeding section than a position half the whole kneading section. For example, the kneading section is divided into 11 divisions, namely, the C1 division (on the feeding side) to the C11 division (on the die side), the multilayered polymers (B) and (C) are preferably added between the C1 division and the C5 division. Although the multilayered polymers (B) and (C) are not low in dispersibility, when the multilayered polymers (B) and (C) are added at positions downstream of the half of the whole kneading section, the dispersibility of each of these multilayered polymers comes to be low, and concentration unevenness tends to occur in the obtained master batch pellet; the use of such a master batch pellet causes concentration unevenness also in the obtained polylactic acid-based resin composition and variations tends to occur in the physical properties of the obtained molded articles.

Thus, the polylactic acid-based resin composition of the present invention can be obtained by using the master batch pellet obtained as described above and by diluting the master batch pellet with the polylactic acid (A) so as for the multilayered polymer (B) and the multilayered polymer (C) to have intended concentrations, respectively.

Next, the molded articles of the present invention are described.

The molded articles of the present invention include the polylactic acid-based resin composition of the present invention, wherein the molded articles are obtained by molding the polylactic acid-based resin composition of the present invention by the molding methods such as extrusion molding, injection molding, blow molding, inflation molding and injection blow molding; and vacuum molding, pressure molding and vacuum pressure molding after processing into sheet.

Specifically, examples of the molded articles of the present invention include: a film and a sheet produced by extrusion molding and molded articles produced by processing these film and sheet; a molded article produced by injection molding; a molded article produced by bead foaming or extrusion foaming; and a hollow molded article produced by blow molding and a molded article produced by processing the hollow molded article.

The molded articles of the present invention are preferably designed to be a sheet produced by extrusion molding or a film produced by stretching the sheet, by making the most use of the advantage that the polylactic acid-based resin composition of the present invention is excellent in transparency.

The molded articles of the present invention may be coated with a coating agent, if necessary. The coating method is not particularly limited; however, examples of the coating method include gravure roll coating, reverse roll coating, wire bar coating, lip coating, air knife coating, curtain flow coating, spray coating and dip coating.

The molded articles of the present invention may be subjected to surface treatment, if necessary. Examples of the surface treatment method include corona discharge treatment, plasma treatment and acid treatment.

Next, description is made on the method for producing a sheet and the method for producing a film as the method for producing the molded article of the present invention.

The method for producing a sheet is not particularly limited; however, examples of the method for producing a sheet include a T-die method, an inflation method and a calender method. Preferable among these methods are the T-die method in which the materials are melt-kneaded and extruded by using a T-die and the inflation method.

When a polylactic acid-based sheet is produced by the T-die method, such a master batch pellet as described above is beforehand prepared, and then the master batch pellet and the polylactic acid (A) are preferably fed to the hopper of the extruder in a film producing apparatus. For melt kneading, there can be used a common kneading machine such as a single screw extruder, a double screw extruder, a roll kneader and a Brabender kneader.

The temperature conditions in the sheet production are preferably such that the cylinder temperature is 150 to 250° C., the T-die temperature is 160 to 250° C. The temperature of the casting roll is preferably controlled at 20 to 40° C. According to this method, a polylactic acid-based sheet of 50 to 2000 μm in thickness is obtained.

Next, in the method for producing a film, the polylactic acid-based sheet prepared by the aforementioned production method is preferably uniaxially or biaxially stretched. Examples of the stretching method include a roll method and a tenter method; it is preferable to adopt any of a uniaxial stretching method, a successive biaxial stretching method and a simultaneous biaxial stretching method.

The area magnification factor in stretching is preferably 4 to 16. When the area magnification factor is less than 4, the mechanical properties, particularly the tensile strength of the obtained film is low and the film is sometimes not practically usable. When the area magnification factor exceeds 16, unpreferably the film is sometimes broken midway through stretching due to the stretching stress beyond the breakage limit of the film.

The temperature of the sheet during stretching is preferably 50 to 110° C. and more preferably 60 to 90° C. When the stretching temperature is lower than 50° C., the film is broken at the initial stage of the stretching due to the quantity of heat insufficient for stretching. When the stretching temperature exceeds 110° C., heat is excessively applied to the film, and hence the stretching results in draw stretching and stretching speckles tend to occur frequently.

For the purpose of imparting dimensional stability to the stretched film, thermal relaxation treatment may be applied to the stretched film after stretching. As the thermal relaxation method, the following methods can be selected: a hot-air blowing method, an infrared radiation irradiation method, a microwave irradiation method, and a method of bringing the film into contact with a heat roll; preferable among these methods is the hot air blowing method because this method is capable of heating the film uniformly with a satisfactory accuracy. In application of the hot air blowing method, the heat relaxation treatment is preferably performed under the conditions that the heating temperature falls within a range from 80 to 160° C. and the heating time is 1 second or more, and the relaxation rate is 2 to 8%.

The thickness of the obtained film is preferably 10 to 60 μm. The thickness less than 10 μm results in insufficient elasticity of the packaging bag obtained from this film; the thickness larger than 60 μm unpreferably results in cost disadvantage.

A satisfactory packed article is obtained even by using a single layer of the thus obtained polylactic acid-based stretched film, which is the molded article of the present invention. However, other resins may be laminated on the polylactic acid-based stretched film, according to the contents, the storage methods and the bag-making method. Examples of the lamination method include coating, direct lamination and extrusion lamination; the lamination method can be appropriately selected according to the required performances.

EXAMPLES

Next, the present invention is specifically described with reference to Examples. The measurements and the evaluations of the various properties in Examples were performed as follows.

(1) Mass Average Molecular Weight (Mw) of Polylactic Acid (A)

The mass average molecular weight of the polylactic acid (A) was measured by using a gel permeation chromatography apparatus (manufactured by Shimadzu Corp.) equipped with a differential refractive index detector (RID-10A, manufactured by Shimadzu Corp.) and by using tetrahydrofuran (THF) as the eluent at the flow rate of 1.0 ml/min and at 40° C. The columns SHODEX KF-805L and KF-804L (Showa Denko K.K.) were used as connected to each other. The sample was prepared as follows and used for the measurement: 10 mg of the polylactic acid (A) was dissolved in 0.5 ml of chloroform, then the resulting solution was diluted with 5 ml of THF, and the diluted solution was filtered with a 0.45- μm filter to prepare the measurement sample. The molecular weight was determined relative to polystyrene standards (manufactured by Waters Corp.).

(2) Content (%) of D-Isomer of Polylactic Acid (A)

To 6 ml of a 1N-potassium hydroxide/methanol solution, about 0.3 g of the polylactic acid (A) was added and sufficiently stirred at 65° C. to decompose the polylactic acid. Then, to the resulting solution, 450 μl of sulfuric acid was added and stirred at 65° C. to convert the lactic acid to methyl lactate. With 5 ml of the resulting sample solution, 3 ml of purified water and 13 ml of methylene chloride were mixed and the resulting mixture was shaken up. The mixture was allowed to stand for separation, and then about 1.5 ml of the lower organic layer was sampled, filtered with a disc filter having a pore size of 0.45 μm for HPLC, and then subjected to a GC measurement with the HP-6890 Series GC System manufactured by Hewlett-Packard Co. The proportion (%) of the peak area of methyl D-lactate in the total peak area of the methyl lactate was derived, and this proportion was defined as the content (%) of the D-isomer.

(3) Content of Residual Lactide in Polylactic Acid (A)

A sample solution for measurement was prepared by adding 10 ml of dichloromethane and 0.5 ml of a 100 ppm 2,6-dimethyl-γ-pyrone internal standard solution to 0.5 g of the polylactic acid (A), and by stirring for dissolution the resulting mixture with a shaker (150 rpm, 40 minutes). To the resulting solution, cyclohexane was added to precipitate the polymer, then the solution was filtered with a disc filter for HPLC (pore size: 0.45 μm), and the filtrate was subjected to a measurement with a gas chromatography. As the standard substance, L-lactide manufactured by Tokyo Chemical Industry Co., Ltd. was used.

For the gas chromatography (HP-6890, manufactured by Hewlett-Packard Co.), helium (He) was used as a carrier gas at a flow rate of 2.5 ml/min, and the oven program conditions were as follows: hold at 80° C. for 1 minute, ramp to 200° C. at 20° C./min, ramp to 280° C. at 30° C./min, and hold at 280° C. for 5 minutes. The column DB-17 (30 m×0.25 mm×0.25 μm) manufactured by J&W Scientific, Inc. was used, a detector FID (temperature: 300° C.) was used and the measurement was performed by an internal standard method.

(4) Melting Point of Polylactic Acid (A)

A differential scanning calorimeter (DSC-7, manufactured by PerkinElmer Corp.) was used. The melting point of the polylactic acid (A) was defined as the melting peak temperature (Tm) measured under the following conditions: the polylactic acid (A) was increased in temperature from 20° C. to 250° C. at a rate of 20° C./min, held at 250° C. for 5 minutes, then cooled from 250° C. to 0° C. at a rate of 20° C./min, held at 0° C. for 5 minutes, and again increased in temperature from 0° to 250° C. at a rate of 20° C./min.

(5) Haze (Transparency)

Haze was measured for the obtained sheet of 250 μm in thickness and the obtained film of 25 μm in thickness according to JIS-K7105 with the Haze Meter NDH-2000 manufactured by Nippon Denshoku Industries Co., Ltd. For each of the sheet and film, the number of samples was set at 5, and the average value of the measured values of these samples was defined as the measurement value.

(6) Impact Resistance of Sheet

The impact resistance of a sheet was measured by using a film impact tester manufactured by Toyo Seiki Seisaku-sho, Ltd. in an atmosphere of 20° C. and 65% RH as follows: a 250-μm thick sheet fixed under strain was hit with an impact head (0.5 inch, hemisphere) having a pendulum capacity of 30 kgf·cm, and the energy required for penetrating the 250- μm thick sheet was measured.

(7) Flex Durability of Stretched Film

From each of the obtained stretched films, a specimen of 180 mm in length×280 mm in width was prepared; according to ASTM F 392, flexing of the specimen was repeated 200 times and 500 times in an atmosphere of 20° C. with a Gelbo tester manufactured by Tester Sangyo Co., Ltd. The specimen subjected to the flex test 200 times or 500 times was put on a sheet of white paper, an ink was applied to the specimen and the number of the spots of the ink transferred to the white paper was counted. The flex durability of the specimen was evaluated with respect to the number of the ink spots on the white paper on the basis of the following four grades.

[Evaluation After 200 Times Flex]

E(Excellent): The number of the spots of the ink transferred to the white paper is less than five.

G(Good): The number of the spots of the ink transferred to the white paper is five or more and less than 10.

A(Average): The number of the spots of the ink transferred to the white paper is 10 or more and less than 20.

P(Poor): The number of the spots of the ink transferred to the white paper is 20 or more, or alternatively, the stretched film was broken.

[Evaluation After 500 Times Flex]

E(Excellent): The number of the spots of the ink transferred to the white paper is less than 10.

G(Good): The number of the spots of the ink transferred to the white paper is 10 or more and less than 40.

A(Average): The number of the spots of the ink transferred to the white paper is 40 or more and less than 100.

P(Poor): The number of the spots of the ink transferred to the white paper is 100 or more, or alternatively, the stretched film was broken.

(8) Flexibility of Stretched Film

The texture of each of the obtained stretched films was evaluated through tactile impression on the basis of the following three grades.

G: Good

A: Average

P: Poor (9) Impact Resistance of Injection Molded Article

[Izod Impact Test]

The Izod impact strength was measured according to ASTM Standard D-256, by using each of the obtained injection molded articles (X) with a notch formed therein. The Izod impact strength was evaluated on the basis of the following four grades.

E(Excellent): 100 J/m or more

G(Good): 50 J/m or more and less than 100 J/m

A(Average): 30 J/m or more and less than 50 J/m

P(Poor): Less than 30 J/m

[Falling Weight Impact Test]

By using each of the obtained injection molded articles (Y), the impact strength was measured according to ASTM-2794. Specifically, by varying the height (cm) of a falling weight under the conditions of the falling weight of 300 gf and a tip R=⅛ inch, the fracture state was visually observed every five times of the test, and the falling weight height (cm) causing absolutely no fracture was defined as the impact strength. The impact strength was evaluated by using the measured value on the basis of the following three grades.

G(Good): 100 cm or more

A(Average): 30 cm or more and 100 cm or less

P(Poor): Less than 30 cm

Next, the materials used in Examples and Comparative Examples are shown.

Polylactic Acid (A)

(A-1): Polylactic acid (manufactured by NatureWorks LLC, Product No. 4032D), D-isomer content: 1.2 mol %, residual lactide content: 0.2% by mass, mass average molecular weight (Mw): 160,000, melting point: 165° C.

(A-2): Polylactic acid (manufactured by NatureWorks LLC, Product No. 4042D), D-isomer content: 4.0 mol %, residual lactide content: 0.2% by mass, mass average molecular weight (Mw): 160,000, melting point: 150° C.

(A-3): Polylactic acid (manufactured by NatureWorks LLC, Product No. 3001D), D-isomer content: 1.4 mol %, residual lactide content: 0.2% by mass, mass average molecular weight (Mw): 130,000, melting point: 165° C.

(A-4): Polylactic acid (manufactured by Zhejing Hisun Biochemicals Co., Ltd., Product No. REVODE 110), D-isomer content: 2.0 mol %, residual lactide content: 0.2% by mass, mass average molecular weight (Mw): 160,000, melting point: 160° C.

Multilayered Polymer (B)

(B-1) Paraloid BPM-500 manufactured by Rohm and Haas Corp., core-shell type, core layer: acrylic rubber (B-2) Metablen W-450A manufactured by Mitsubishi Rayon Co., Ltd., core-shell type, core layer: acrylic rubber (B-3) Metablen W-600A manufactured by Mitsubishi Rayon Co., Ltd., core-shell type, core layer: acrylic rubber Multilayered Polymer (C)

(C-1): Metablen S-2006 manufactured by Mitsubishi Rayon Co., Ltd., core-shell type, core layer: a composite rubber composed of a silicone component and an acrylic component (C-2) Metablen S-2001 manufactured by Mitsubishi Rayon Co., Ltd., core-shell type, core layer: a composite rubber composed of a silicone component and an acrylic component Multilayered Polymer (D)

(D-1): Metablen C-223A manufactured by Mitsubishi Rayon Co., Ltd., core-shell type, core layer: butadiene rubber (D-2): Metablen C-323A manufactured by Mitsubishi Rayon Co., Ltd., core-shell type, core layer: butadiene rubber Cross-linking Agent (E)

(E-1): Blenmer PDE-50 manufactured by NOF Corp., diethylene glycol dimethacrylate Cross-linking Agent (F)

(F-1): Di-t-butyl peroxide manufactured by NOF Corp.

Other Resin (G)

(G-1): Pelestat 230 manufactured by Sanyo Chemical Industries, Ltd., polyether/olefin block copolymer (G-2): Acrypet VH manufactured by Mitsubishi Rayon Co. Ltd., PMMA resin Example 1

A double screw extruder (PCM-30, manufactured by Ikegai Corp.) was used; the polylactic acid (A-1) was fed from a hopper to the extruder, and the multilayered polymer (B-1) and the multilayered polymer (C-1) were added as metered with separate feeders, respectively, so as for the contents of these multilayered polymers to be the values shown in Table 1; the resulting mixture was melt kneaded and extruded at a cylinder temperature of 200° C. and a die temperature of 210° C.; the resulting strand was cooled and then cut to the pellet size to yield a master batch pellet (M-1).

Examples 2 to 10 and Comparative Examples 1 and 2

Master batch pellets (M-2) to (M-10), and (m-1) and (m-2) were obtained in the same manner as in Example 1 except that the types and the addition amounts of the polylactic acid (A), the multilayered polymer (B) and the multilayered polymer (C) fed to the double screw extruder were altered so as for the types and the contents of these in the resin compositions to be those shown in Table 1.

Example 11

A master batch pellet (M-11) was obtained in the same manner as in Example 1 except that the addition amounts of the polylactic acid (A-1), the addition amounts of the multilayered polymer (B-1) and the multilayered polymer (C-1) fed to the double screw extruder were altered, and the cross-linking agent (E-1) and the cross-linking agent (F-1) were added so as for the contents of these in the resin composition to be the values shown in Table 1.

Comparative Examples 3 to 8

Master batch pellets (m-3) to (m-8) were obtained in the same manner as in Example 1 except that the multilayered polymer (C) was not added, and the types and the addition amounts of the polylactic acid (A) and the multilayered polymer (B) were altered.

Comparative Examples 9 to 13

Master batch pellets (m-9) to (m-13) were obtained in the same manner as in Example 1 except that the multilayered polymer (B) was not added, and the types and the addition amounts of the polylactic acid (A) and the multilayered polymer (C) were altered.

Comparative Example 14

A master batch pellet (m-14) was obtained in the same manner as in Example 1 except that the multilayered polymer (C) was not added, and two types of the multilayered polymer (B) were added.

Comparative Example 15

A master batch pellet (m-15) was obtained in the same manner as in Example 1 except that the multilayered polymer (B) was not added, and two types of the multilayered polymer (C) were added.

Comparative Examples 16 and 17

Master batch pellets (m-16) and (m-17) were obtained in the same manner as in Example 1 except that the multilayered polymer (C) was not added, and the multilayered polymer (D) was added.

Comparative Examples 18 and 19

Master batch pellets (m-18) and (m-19) were obtained in the same manner as in Example 1 except that the multilayered polymer (B) was not added, and the multilayered polymer (D) was added.

Table 1 shows the compositions of the master batch pellets (the resin compositions constituting the master batch pellets) obtained in Examples 1 to 11 and Comparative Examples 1 to 19.

TABLE 1

| | | Master batch pellet type | Polylactic acid (A) Type | % by mass | Multilayered polymer (B) Type | % by mass | Multilayered polymer (C) Type | % by mass | Other component Type | % by mass |
|---|---|---|---|---|---|---|---|---|---|---|
| Examples | 1 | M-1 | A-1 | 67 | B-1 | 16.5 | C-1 | 16.5 | — | — |
| | 2 | M-2 | A-1 | 70 | B-1 | 21 | C-1 | 9 | — | — |
| | 3 | M-3 | A-1 | 70 | B-1 | 9 | C-1 | 21 | — | — |
| | 4 | M-4 | A-1 | 67 | B-2 | 16.5 | C-1 | 16.5 | — | — |
| | 5 | M-5 | A-1 | 67 | B-3 | 16.5 | C-1 | 16.5 | — | — |
| | 6 | M-6 | A-1 | 67 | B-1 | 16.5 | C-2 | 16.5 | — | — |
| | 7 | M-7 | A-1 | 67 | B-2 | 16.5 | C-2 | 16.5 | — | — |
| | 8 | M-8 | A-2 | 67 | B-1 | 16.5 | C-1 | 16.5 | — | — |
| | 9 | M-9 | A-3 | 67 | B-1 | 16.5 | C-1 | 16.6 | — | — |
| | 10 | M-10 | A-4 | 67 | B-1 | 16.5 | C-1 | 16.5 | — | — |
| | 11 | M-11 | A-1 | 60 | B-1 | 18.8 | C-1 | 18.8 | E-1 | 0.8 |
| | | | | | | | | | F-1 | 1.6 |
| Comparative Examples | 1 | m-1 | A-1 | 70 | B-1 | 27 | C-1 | 3 | — | — |
| | 2 | m-2 | A-1 | 70 | B-1 | 3 | C-1 | 27 | — | — |
| | 3 | m-3 | A-1 | 70 | B-1 | 30 | — | — | — | — |
| | 4 | m-4 | A-1 | 70 | B-2 | 30 | — | — | — | — |
| | 5 | m-5 | A-1 | 70 | B-3 | 30 | — | — | — | — |
| | 6 | m-6 | A-2 | 70 | B-1 | 30 | — | — | — | — |
| | 7 | m-7 | A-3 | 70 | B-1 | 30 | — | — | — | — |
| | 8 | m-8 | A-4 | 70 | B-1 | 30 | — | — | — | — |
| | 9 | m-9 | A-1 | 70 | — | — | C-1 | 30 | — | — |
| | 10 | m-10 | A-1 | 70 | — | — | C-2 | 30 | — | — |
| | 11 | m-11 | A-2 | 70 | — | — | C-1 | 30 | — | — |
| | 12 | m-12 | A-3 | 70 | — | — | C-1 | 30 | — | — |
| | 13 | m-13 | A-4 | 70 | — | — | C-1 | 30 | — | — |
| | 14 | m-14 | A-1 | 67 | B-1 | 16.5 | — | — | — | — |
| | | | | | B-2 | 16.5 | | | | |
| | 15 | m-15 | A-1 | 67 | — | — | C-1 | 16.5 | — | — |
| | | | | | | | C-2 | 16.5 | | |
| | 16 | m-16 | A-1 | 67 | B-1 | 16.5 | — | — | D-1 | 16.5 |
| | 17 | m-17 | A-1 | 67 | B-2 | 16.5 | — | — | D-1 | 16.5 |
| | 18 | m-18 | A-1 | 67 | — | — | C-1 | 16.5 | D-1 | 16.5 |
| | 19 | m-19 | A-1 | 67 | — | — | C-1 | 16.5 | D-2 | 16.5 |

Example 12

[Resin Composition]

The master batch pellet (M-1) obtained in Example 1 and the polylactic acid (A-1) were dry blended in a mass ratio [(M-1)/(A-1)] of 15/85, and the following sheet, stretched film and injection molded article were produced. In other words, the composition of the resin composition constituting these molded articles was such that the content of the polylactic acid (A-1) was 95% by mass, the content of the multilayered polymer (B-1) was 2.5% by mass and the content of the multilayered polymer (C-1) was 2.5% by mass.

[Sheet]

The master batch pellet (M-1) and the polylactic acid (A-1) dry blended as described above were melt extruded with a single screw extruder having a caliber of 90 mm with a T-die temperature set at 230° C., the resulting extrudate was made to adhere onto a casting roll temperature-controlled at 35° C., and thus cooled to yield a 250-μm thick polylactic acid-based sheet composed of the resin composition of the present invention.

[Stretched Film]

The ends of the obtained polylactic acid-based sheet were gripped with clips of a tenter-type simultaneous biaxial stretching machine; the polylactic acid-based sheet was made to travel through a preheating zone set at 81° C., and then simultaneously stretched at 79° C. by a factor of 3.0 in MD and by a factor of 3.3 in TD. Subsequently, the stretched sheet was heat treated at 140° C. for 4 seconds at a TD relaxation rate of 5%, then cooled to room temperature and taken up to yield a 25-μm thick polylactic acid-based stretched film.

[Injection Molded Articles]

From the master batch pellet (M-1) and the polylactic acid (A-1) dry blended as described above, an injection molded article (X) of 5 inches in length, ½ inch in width and ⅛ inch in thickness and an injection molded article (Y) of 85 mm in length, 50 mm in width and 2 mm in thickness were prepared as the specimens for measuring general physical properties, by using an injection molding machine, Model IS-80G, manufactured by Toshiba Machine Co., Ltd., while the cylinder temperature was being regulated at 200° C. and the die surface temperature was being regulated at 25° C.

Examples 13 to 28 and Comparative Examples 21 to 43

[Resin Compositions]

The master batch pellets used were altered to the master batch pellets shown in Table 1, and the types of the polylactic acid used and the mass ratios (M/A) between the master batch pellet (M) and the polylactic acid (A) were altered as shown in Tables 2 or 3; thus the polylactic acid (A) and the master batch pellet (M) were dry blended in each of Examples 13 to 28 and Comparative Examples 21 to 43. Then, the following sheets, stretched films and injection molded articles were produced. The composition of the resin composition constituting these molded articles in each of Examples 13 to 28 and Comparative Examples 21 to 43 is shown in Table 2 or Table 3.

[Sheets]

In each of Examples 13 to 28 and Comparative Examples 21 to 43, a 250-μm thick polylactic acid-based sheet was obtained in the same manner as in Example 12 except that the master batch pellet (M) and the polylactic acid (A) blended as described above were fed.

[Stretched Films]

In each of Examples 13 to 28 and Comparative Examples 21 to 43, a 25-μm thick polylactic acid-based stretched film was obtained in the same manner as in Example 12 except that the obtained polylactic acid-based sheet was used.

[Injection Molded Articles]

In each of Examples 13 to 28 and Comparative Examples 21 to 43, an injection molded article (X) and an injection molded article (Y) were prepared as the specimens for measuring general physical properties, in the same manner as in Example 12 except that the master batch pellet (M) and the polylactic acid (A) blended as described above were used.

Comparative Example 20

[Resin Composition]

Without using any master batch pellet, only the polylactic acid (A-1) was used. Then, the following sheet, stretched film and injection molded articles were produced.

[Sheet]

A 250-μm thick polylactic acid-based sheet was obtained in the same manner as in Example 12 except that only the polylactic acid (A-1) was fed.

[Stretched Film]

A 25-μm thick polylactic acid-based stretched film was obtained in the same manner as in Example 12 except that the obtained polylactic acid-based sheet was used.

[Injection Molded Articles]

An injection molded article (X) and an injection molded article (Y) were prepared as the specimens for measuring general physical properties, in the same manner as in Example 12 except that only the polylactic acid (A-1) was used.

Comparative Example 44

[Resin Composition]

The polylactic acid (A-1) and (G-1) as the other resin (G) were blended in a mass ratio [(A-1)/(G-1)] of 90/10, and the following sheet, stretched film and injection molded articles were produced. In other words, the composition of the resin composition constituting these molded articles was such that the content of the polylactic acid (A-1) was 90% by mass and the content of the other resin (G-1) was 10% by mass.

[Sheet]

A 250-μm thick polylactic acid-based sheet was obtained in the same manner as in Example 12 except that the polylactic acid (A-1) and the other resin (G-1) blended as described above were fed.

[Stretched Film]

A 25-μm thick polylactic acid-based stretched film was obtained in the same manner as in Example 12 except that the obtained polylactic acid-based sheet was used.

[Injection Molded Articles]

An injection molded article (X) and an injection molded article (Y) were prepared as the specimens for measuring general physical properties, in the same manner as in Example 12 except that the polylactic acid (A-1) and the other resin (G-1) blended as described above were fed.

Comparative Example 45

[Resin Composition]

The polylactic acid (A-1) and (G-2) as the other resin (G) were blended in a mass ratio [(A-1)/(G-2)] of 50/50, and the following sheet, stretched film and injection molded articles were produced. In other words, the composition of the resin composition constituting these molded articles was such that the content of the polylactic acid (A-1) was 50% by mass and the content of the other resin (G-2) was 50% by mass.

[Sheet]

A 250-μm thick polylactic acid-based sheet was obtained in the same manner as in Example 12 except that the polylactic acid (A-1) and the other resin (G-2) blended as described above were fed.

[Stretched Film]

A 25-μm thick polylactic acid-based stretched film was obtained in the same manner as in Example 12 except that the obtained polylactic acid-based sheet was used.

[Injection Molded Articles]

An injection molded article (X) and an injection molded article (Y) were prepared as the specimens for measuring general physical properties, in the same manner as in Example 12 except that the polylactic acid (A-1) and the other resin (G-2) blended as described above were fed.

Comparative Example 46

[Resin Composition]

The polylactic acid (A-1), the master batch pellet (m-3) and (G-2) as the other resin (G) were blended in a mass ratio [(A-1)/(m-3)/(G-2)] of 21.9/33/45, and the following sheet, stretched film and injection molded articles were produced. In other words, the composition of the resin composition constituting these molded articles was such that the content of the polylactic acid (A-1) was 45% by mass, the content of the multilayered polymer (B-1) was 10% by mass and the content of the other resin (G-2) was 45% by mass.

[Sheet]

A 250-μm thick polylactic acid-based sheet was obtained in the same manner as in Example 12 except that the polylactic acid (A-1), the master batch pellet (m-3) and the other resin (G-2) blended as described above were fed.

[Stretched Film]

A 25-μm thick polylactic acid-based stretched film was obtained in the same manner as in Example 12 except that the obtained polylactic acid-based sheet was used.

[Injection Molded Articles]

An injection molded article (X) and an injection molded article (Y) were prepared as the specimens for measuring general physical properties, in the same manner as in Example 12 except that the polylactic acid (A-1), the master batch pellet (m-3) and the other resin (G-2) blended as described above were fed.

Comparative Example 47

[Resin Composition]

The polylactic acid (A-1), the master batch pellet (m-9) and (G-2) as the other resin (G) were blended in a mass ratio [(A-1)/(m-9)/(G-2)] of 21.9/33/45, and the following sheet, stretched film and injection molded articles were produced. In other words, the composition of the resin composition constituting these molded articles was such that the content of the polylactic acid (A-1) was 45% by mass, the content of the multilayered polymer (C-1) was 10% by mass and the content of the other resin (G-2) was 45% by mass.

[Sheet]

A 250-μm thick polylactic acid-based sheet was obtained in the same manner as in Example 12 except that the polylactic acid (A-1), the master batch pellet (m-9) and the other resin (G-2) blended as described above were fed.

[Stretched Film]

A 25-μm thick polylactic acid-based stretched film was obtained in the same manner as in Example 12 except that the obtained polylactic acid-based sheet was used.

[Injection Molded Articles]

An injection molded article (X) and an injection molded article (Y) were prepared as the specimens for measuring general physical properties, in the same manner as in Example 12 except that the polylactic acid (A-1), the master batch pellet (m-9) and the other resin (G-2) blended as described above were fed.

Tables 2 and Table 3 show the property values and the evaluation results of the resin compositions, the sheets, the stretched films and the injection molded articles obtained in Examples 12 to 28 and Comparative Examples 20 to 47, respectively.

TABLE 2

| | | Materials | | Composition of polylactic acid-based resin composition | | | | | | | |
|---|---|---|---|---|---|---|---|---|---|---|---|
| | | Master batch pellet | Mater batch pellet/ polylactic acid | Polylactic acid (A) | | Multilayered polymer (B) | | Multilayered polymer (C) | | Other component | |
| | | Type | Mass ratio | Type | % by mass | Type | % by mass | Type | % by mass | Type | % by mass |
| Examples | 12 | M-1 | 15/85 | A-1 | 95 | B-1 | 2.5 | C-1 | 2.5 | — | — |
| | 13 | M-1 | 6/94 | A-1 | 98 | B-1 | 1 | C-1 | 1 | — | — |
| | 14 | M-3 | 16.6/83.4 | A-1 | 95 | B-1 | 1.5 | C-1 | 3.5 | — | — |
| | 15 | M-1 | 30/70 | A-1 | 90 | B-1 | 5 | C-1 | 5 | — | — |
| | 16 | M-2 | 33/67 | A-1 | 90 | B-1 | 7 | C-1 | 3 | — | — |
| | 17 | M-1 | 48/52 | A-1 | 84 | B-1 | 8 | C-1 | 8 | — | — |
| | 18 | M-6 | 15/85 | A-1 | 95 | B-1 | 2.5 | C-2 | 2.5 | — | — |
| | 19 | M-4 | 15/85 | A-1 | 95 | B-2 | 2.5 | C-1 | 2.5 | — | — |
| | 20 | M-7 | 15/85 | A-1 | 95 | B-2 | 2.5 | C-2 | 2.5 | — | — |
| | 21 | M-5 | 15/85 | A-1 | 95 | B-3 | 2.5 | C-1 | 2.5 | — | — |
| | 22 | M-8 | 15/85 | A-2 | 95 | B-1 | 2.5 | C-1 | 2.5 | — | — |
| | 23 | M-8 | 30/70 | A-2 | 90 | B-1 | 5 | C-1 | 5 | — | — |
| | 24 | M-9 | 15/85 | A-3 | 95 | B-1 | 2.5 | C-1 | 2.5 | — | — |
| | 25 | M-9 | 30/70 | A-3 | 90 | B-1 | 5 | C-1 | 5 | — | — |
| | 26 | M-10 | 15/85 | A-4 | 95 | B-1 | 2.5 | C-1 | 2.5 | — | — |
| | 27 | M-10 | 30/70 | A-4 | 90 | B-1 | 5 | C-1 | 5 | — | — |

TABLE 2-continued

| | | | | | | | | | | |
|---|---|---|---|---|---|---|---|---|---|---|
| 28 | M-11 | 25/75 | A-1 | 90 | B-1 | 4.7 | C-1 | 4.7 | E-1 | 0.2 |
| | | | | | | | | | F-1 | 0.4 |

| | | | Sheet | | Stretched film | | | | Injection molded article | |
|---|---|---|---|---|---|---|---|---|---|---|
| | | | | Impact test kgf·cm/100 μm | | | Gelbo test (flex durability) | | | Falling |
| | | | Haze % | | Haze % | Tex- ture | Number of ink spots | 200 times | Number of ink spots | 500 times | Izod impact test | weight impact test |

| | | Haze % | kgf·cm/100 μm | Haze % | Texture | Number of ink spots | 200 times | Number of ink spots | 500 times | Izod impact test | weight impact test |
|---|---|---|---|---|---|---|---|---|---|---|---|
| Examples | 12 | 3 | 11 | 1.8 | G | 3 | E | 8 | E | E | G |
| | 13 | 2 | 6 | 1.1 | G | 8 | G | 38 | G | A | A |
| | 14 | 5 | 9 | 2.5 | G | 4 | E | 15 | G | G | G |
| | 15 | 5 | 15 | 2.5 | G | 1 | E | 4 | E | E | G |
| | 16 | 5 | 12 | 2.4 | G | 3 | E | 9 | E | E | G |
| | 17 | 6 | 20 | 3.2 | G | 0 | E | 2 | E | E | G |
| | 18 | 4 | 10 | 2.3 | G | 4 | E | 8 | E | E | G |
| | 19 | 4 | 10 | 2.2 | G | 4 | E | 9 | E | E | G |
| | 20 | 4 | 9 | 2.4 | G | 5 | G | 11 | G | G | G |
| | 21 | 4 | 10 | 2.4 | G | 4 | E | 9 | E | E | G |
| | 22 | 4 | 11 | 2.1 | G | 4 | E | 8 | E | E | G |
| | 23 | 5 | 15 | 2.5 | G | 1 | E | 4 | E | E | G |
| | 24 | 3 | 10 | 1.8 | G | 5 | G | 9 | E | E | G |
| | 25 | 4 | 14 | 2.2 | G | 2 | E | 5 | E | E | G |
| | 26 | 5 | 9 | 2.2 | G | 6 | G | 10 | G | G | G |
| | 27 | 7 | 13 | 2.9 | G | 4 | E | 5 | E | E | G |
| | 28 | 8 | 16 | 3.4 | A | 7 | G | 18 | G | E | G |

TABLE 3

| | | Materials | | Composition of polylactic acid-based resin composition | | | | | | | |
|---|---|---|---|---|---|---|---|---|---|---|---|
| | | Master batch pellet | Mater batch pellet/ polylactic acid | Polylactic acid (A) | | Multilayered polymer (B) | | Multilayered polymer (C) | | Other component | |
| | | Type | Mass ratio | Type | % by mass | Type | % by mass | Type | % by mass | Type | % by mass |
| Comparative Examples | 20 | — | — | A-1 | 100 | — | — | — | — | — | — |
| | 21 | M-1 | 2.4/97.6 | A-1 | 99.2 | B-1 | 0.4 | C-1 | 0.4 | — | — |
| | 22 | m-1 | 33/67 | A-1 | 90 | B-1 | 9 | C-1 | 1 | — | — |
| | 23 | m-2 | 33/67 | A-1 | 90 | B-1 | 1 | C-1 | 9 | — | — |
| | 24 | M-1 | 60/40 | A-1 | 80 | B-1 | 10 | C-1 | 10 | — | — |
| | 25 | m-3 | 16.6/83.4 | A-1 | 95 | B-1 | 5 | — | — | — | — |
| | 26 | m-14 | 15/85 | A-1 | 95 | B-1 | 2.5 | — | — | — | — |
| | | | | | | B-2 | 2.5 | | | | |
| | 27 | m-3 | 33/67 | A-1 | 90 | B-1 | 10 | — | — | — | — |
| | 28 | m-4 | 33/67 | A-1 | 90 | B-2 | 10 | — | — | — | — |
| | 29 | m-5 | 33/67 | A-1 | 90 | B-3 | 10 | — | — | — | — |
| | 30 | m-6 | 33/67 | A-2 | 90 | B-1 | 10 | — | — | — | — |
| | 31 | m-7 | 33/67 | A-3 | 90 | B-1 | 10 | — | — | — | — |
| | 32 | m-8 | 33/67 | A-4 | 90 | B-1 | 10 | — | — | — | — |
| | 33 | m-16 | 15/85 | A-1 | 95 | B-1 | 2.5 | — | — | D-1 | 2.5 |
| | 34 | m-17 | 15/85 | A-1 | 95 | B-2 | 2.5 | — | — | D-1 | 2.5 |
| | 35 | m-9 | 16.6/83.4 | A-1 | 95 | — | — | C-1 | 5 | — | — |
| | 36 | m-15 | 15/85 | A-1 | 95 | — | — | C-1 | 2.5 | — | — |
| | | | | | | | | C-2 | 2.5 | | |
| | 37 | m-9 | 33/67 | A-1 | 90 | — | — | C-1 | 10 | — | — |
| | 38 | m-10 | 33/67 | A-1 | 90 | — | — | C-2 | 10 | — | — |
| | 39 | m-11 | 33/67 | A-2 | 90 | — | — | C-1 | 10 | — | — |
| | 40 | m-12 | 33/67 | A-3 | 90 | — | — | C-1 | 10 | — | — |
| | 41 | m-13 | 33/67 | A-4 | 90 | — | — | C-1 | 10 | — | — |
| | 42 | m-18 | 15/85 | A-1 | 95 | — | — | C-1 | 2.5 | D-1 | 2.5 |
| | 43 | m-19 | 15/85 | A-1 | 95 | — | — | C-1 | 2.5 | D-2 | 2.5 |
| | 44 | — | — | A-1 | 90 | — | — | — | — | G-1 | 10 |
| | 45 | — | — | A-1 | 50 | — | — | — | — | G-2 | 50 |
| | 46 | m-3 | 33/21.9 | A-1 | 45 | B-1 | 10 | — | — | G-2 | 45 |
| | 47 | m-9 | 33/21.9 | A-1 | 45 | — | — | C-1 | 10 | G-2 | 45 |

TABLE 3-continued

| | | Sheet | | Stretched film | | | | | Injection molded article | |
|---|---|---|---|---|---|---|---|---|---|---|
| | | | Impact test kgf·cm/100 μm | | | Gelbo test (flex durability) | | | | Falling |
| | | Haze % | | Haze % | Texture | Number of ink spots | 200 times | Number of ink spots | 500 times | Izod impact test | weight impact test |
| Comparative Examples | 20 | 3 | 2 | 0.6 | P | * | P | * | P | P | P |
| | 21 | 3 | 3 | 1.3 | A | * | P | * | P | P | P |
| | 22 | 9 | 8 | 4.1 | G | 12 | A | 47 | A | A | P |
| | 23 | 12 | 10 | 4.7 | G | 10 | A | 30 | G | E | G |
| | 24 | 16 | 17 | 5.5 | G | 4 | E | 8 | E | E | G |
| | 25 | 5 | 4 | 2.4 | A | 18 | A | * | P | P | P |
| | 26 | 6 | 4 | 2.7 | A | 24 | P | * | P | P | P |
| | 27 | 9 | 9 | 4.0 | G | 10 | A | * | P | G | P |
| | 28 | 10 | 8 | 4.3 | G | 12 | A | * | P | G | P |
| | 29 | 10 | 8 | 4.2 | G | 13 | A | * | P | G | P |
| | 30 | 9 | 9 | 4.0 | G | 10 | A | * | P | G | P |
| | 31 | 8 | 8 | 3.9 | A | 12 | A | * | P | G | P |
| | 32 | 10 | 7 | 4.2 | A | 14 | A | * | P | A | P |
| | 33 | 16 | 10 | 5.4 | A | 12 | A | 62 | A | E | A |
| | 34 | 17 | 9 | 5.6 | A | 15 | A | 66 | A | G | A |
| | 35 | 8 | 7 | 3.7 | G | 15 | A | 51 | A | A | A |
| | 36 | 9 | 7 | 4.1 | G | 20 | P | 57 | A | A | A |
| | 37 | 12 | 9 | 4.8 | G | 8 | G | 33 | G | G | G |
| | 38 | 13 | 9 | 5.0 | G | 11 | A | 42 | A | G | A |
| | 39 | 12 | 9 | 4.8 | G | 9 | G | 35 | G | G | G |
| | 40 | 11 | 9 | 4.6 | G | 10 | A | 45 | A | G | G |
| | 41 | 13 | 8 | 4.9 | G | 12 | A | 42 | A | G | A |
| | 42 | 20 | 13 | 6.5 | G | 9 | G | 29 | G | E | G |
| | 43 | 22 | 12 | 6.6 | G | 10 | A | 33 | G | E | G |
| | 44 | 33 | 9 | 7.7 | A | 7 | G | 40 | A | G | P |
| | 45 | 4 | 3 | 1.9 | P | * | P | * | P | P | P |
| | 46 | 13 | 4 | 4.7 | A | 34 | P | * | P | P | P |
| | 47 | 15 | 4 | 5.3 | A | 25 | P | 62 | A | P | A |

* Film breakage

As can be clearly seen from Table 2, the resin compositions obtained in Examples 12 to 28 each included the polylactic acid (A) and the multilayered polymers (B) and (C) in contents falling within the ranges of the present invention; hence the different types of molded articles obtained from these resin compositions were high in transparency, and excellent in impact resistance, flex durability and flexibility.

The resin composition of Example 28 contained an added cross-linking agent, and hence the unreacted crosslinking agent reacted with the polylactic acid to cause the occurrence of gelified portions in the resin composition; the occurrence of the gelified portions degraded the qualities of the molded articles obtained from the resin composition, leading to a slightly poor evaluation of the transparency.

On the other hand, as can be clearly seen from Table 3, the resin compositions obtained in Comparative Examples 20 and 21 each did not include the multilayered polymers (B) and (C) or included these multilayered polymers in small contents; hence the molded articles obtained from these resin compositions were excellent in transparency, but poor in impact resistance, flex durability and flexibility.

The resin compositions of Comparative Examples 22 and 23 each included the multilayered polymer (B) or the multilayered polymer (C) in a too large content; hence, the molded articles obtained from these resin compositions were poor in transparency. Although these resin compositions each included both of these multilayered polymers, the content of one of the multilayered polymers was too large, and hence the effects of both of these multilayered polymers were not displayed in a balanced manner and the molded articles obtained from these resin compositions were poor in transparency. The resin composition of Comparative Example 24 included the multilayered polymer (B) and the multilayered polymer (C) in too large contents; hence the molded articles obtained from this resin composition were poor in transparency.

The resin compositions of Comparative Examples 25 and 26 each included the multilayered polymer (B) in a content specified in the present invention, but did not include the multilayered polymer (C); hence, the molded articles obtained from these resin compositions were excellent in transparency, but poor in impact resistance and flex durability. The resin compositions of Comparative Examples 27 to 32 each included only the multilayered polymer (B) in a large content; hence, the molded articles obtained from these resin compositions were insufficient in the improvement of the impact resistance and the flex durability and poor in transparency.

The resin compositions of Comparative Examples 33 and 34 each included the multilayered polymer (B) and the multilayered polymer (D) in which the core layer was formed of a butadiene-based rubber; hence, the molded articles obtained from these resin compositions were poor in transparency.

The resin compositions of Comparative Examples 35 to 41 each included only the multilayered polymer (C); hence the molded articles obtained from these resin compositions were poor in transparency.

The resin compositions of Comparative Examples 42 and 43 each included the multilayered polymer (C) and the multilayered polymer (D) in which the core layer was formed of a butadiene-based rubber; hence the molded articles obtained from these resin compositions were poor in transparency.

The resin compositions of Comparative Examples 44 and 45 each did not include the multilayered polymer (B) and the multilayered polymer (C) but included the other resin; hence the molded articles obtained from these resin compositions were poor in any of transparency, impact resistance, flex durability and flexibility. In Comparative Examples 46 and 47, although the multilayered polymer (B) or the multilayered polymer (C) was added, the molded articles obtained from these resin compositions were poor in any of transparency, impact resistance, flex durability and flexibility.

The invention claimed is:

1. A polylactic acid-based resin composition comprising a polylactic acid (A), a multilayered polymer (B) and a multilayered polymer (C),
    wherein a content of each of the multilayered polymer (B) and the multilayered polymer (C) is 0.5 to 8% by mass of the whole resin composition;
    the multilayered polymer (B) and the multilayered polymer (C) are each constituted of a core layer and a shell layer;
    in the multilayered polymer (B), the core layer is made from an acrylic rubber (except for containing a silicone component) and the shell layer is made from methyl methacrylate-based polymer obtained by graft polymerizing the acrylic rubber of the core layer, in the presence of the acrylic rubber of the core layer;
    in the multilayered polymer (C), the core layer is made from a composite rubber containing an acrylic component and the silicone component and the shell layer is made from methyl methacrylate-based polymer obtained by graft polymerizing the composite rubber containing the acrylic component and the silicone component of the core layer, in the presence of the composite rubber containing the acrylic component and the silicone component of the core layer; and
    the composite rubber containing an acrylic component and a silicone component is a rubber constituted of the component obtained by copolymerizing the acrylic component and the silicone component or a mixture obtained by blending a rubber composed of the acrylic component and a rubber composed of the silicone component.

2. The polylactic acid-based resin composition according to claim 1, wherein a total content of the multilayered polymer (B) and multilayered polymer (C) is 2 to 16% by mass of the whole resin composition.

3. A molded article comprising the polylactic acid-based resin composition according to claim 1.

4. A molded article comprising the polylactic acid-based resin composition according to claim 2.

5. A polylactic acid-based master batch pellet constituted of a polylactic acid-based resin composition comprising a polylactic acid (A), a multilayered polymer (B) and a multilayered polymer (C),
    wherein a content of each of the multilayered polymer (B) and the multilayered polymer (C) is 8 to 30% by mass of the whole resin composition;
    the multilayered polymer (B) and the multilayered polymer (C) are each constituted of a core layer and a shell layer;
    in the multilayered polymer (B), the core layer is made from an acrylic rubber (except for containing a silicone component) and the shell layer is made from methyl methacrylate-based polymer obtained by graft polymerizing the acrylic rubber of the core layer, in the presence of the acrylic rubber of the core layer;
    in the multilayered polymer (C), the core layer is made from a composite rubber containing an acrylic component and the silicone component and the shell layer is made from methyl methacrylate-based polymer obtained by graft polymerizing the composite rubber containing the acrylic component and the silicone component of the core layer, in the presence of the composite rubber containing the acrylic component and the silicone component of the core layer; and
    the composite rubber containing an acrylic component and a silicone component is a rubber constituted of the component obtained by copolymerizing the acrylic component and the silicone component or a mixture obtained by blending a rubber composed of the acrylic component and a rubber composed of the silicone component.

* * * * *